United States Patent Office 2,929,835
Patented Mar. 22, 1960

2,929,835

REACTING AN ALKYLENE OXIDE WITH AN ACRYLIC-TYPE ACID USING AN ALKALINE ORGANIC OR INORGANIC CATALYST

Robert A. Hayes, Cuyahoga Falls, and Stephen P. Boutsicaris, Akron, Ohio, assignors to The Firestone Tire & Rubber Company, Akron, Ohio, a corporation of Ohio No Drawing. Application June 6, 1957
Serial No. 663,900

15 Claims. (Cl. 260—486)

This invention relates to an improved process of producing monoesters by reacting an alkylene oxide with an acrylic-type acid. An alkaline catalyst is used in carrying out the reaction, and the reaction is stopped just short of completion in order to produce a high yield of pure product.

The acrylic-type acid is acrylic acid or alpha-methacrylic acid. The alkylene oxide contains 2 to 4 carbon atoms and is ethylene oxide, propylene oxide, or any butylene oxide.

It has been found that some of the alkaline catalysts are comparatively slow, whereas others speed up the reaction very materially. The catalysts which induce more rapid reactions include tertiary heterocyclic amines covered in our copending application Serial No. 663,897, filed June 6, 1957 (abandoned); trialkyl amines which include two open-chain substitutents with the third substituent an open-chain group, a cyclohexyl group or an aralkyl group covered in our copending application Serial No. 663,898, filed June 6, 1957 (abandoned); and basic oxides, hydroxides, acrylates and methacrylates of the alkali and alkaline earth metals covered in our copending application Serial No. 663,899, filed June 6, 1957 (abandoned). There are other alkaline catalysts which can be utilized in carrying out the invention; for example, aromatic tertiary amines, but such catalysts are relatively slow in their action compared with the preferred catalysts of the aforesaid applications.

Other catalysts which may be used are tertiary heterocyclic amines having the formula

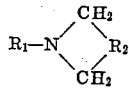

in which $R_1$ is an alkyl group of 1 to 4 carbon atoms and $R_2$, which is in the ring, is from the class consisting of —$CH_2.O.CH_2$—, —$CH_2.CH_2.CH_2$—, —$CH_2.CH_2$—, —$CH_2.O$—, —$CH_2.CH_2.O$—, and —$CH_2.NR_3.CH_2$— (in which $R_3$ is from the class consisting of hydrogen and alkyl substituents containing up to five carbon atoms). Thus the amine is an N-alkyl-substituted morpholine, piperidine, pyrrolidine, etc. The $R_1$ substituents are from the class consisting of methyl, ethyl, propyl, and butyl groups. These propyl and butyl groups include straight-chain compounds and isopropyl, secondary butyl, and tertiary butyl. Thus the catalysts include, for example, N-ethyl morpholine, N-t-butyl morpholine, N-methyl piperidine, N-isopropyl pyrrolidine, N,N-dibutyl-N'-ethylpiperidine, etc.

The preferred organic amine catalysts are the tertiary aliphatic amines, although primary amines and secondary amines may be used. As illustrative of the catalysts which may be employed, the following are listed:

Trimethylamine
Tri-i-propylamine
Tri-n-butylamine
N,N-dimethylcyclohexylamine
N,N-diethylbenzylamine
N-methyl-N-ethyl phenethylamine
N-methyl-N-ethyl cyclohexylamine
N,N-dimethyl benzylamine
N,N-di-n-butyl phenethylamine
N-methylmorpholine
N-ethylpiperidine
N-methyl pyrrolidine
Beta-picoline
Sodium hydroxide
Potassium hydroxide
Calcium hydroxide
Calcium oxide
Magnesium hydroxide
Strontium hydroxide
Sodium acrylate
Barium methacrylate
Magnesium acrylate
Sodium methacrylate
Calcium acrylate Pure monoester—that is, product with an acid number substantially zero and not contaminated with diester, is obtained by vacuum distillation of a crude reaction mixture of a low acid number. The applicants have discovered that an acid number in the range of 2 to 40 is particularly advantageous. The yield of crude, undistilled product of this acid number is almost quantitative, and after the distillation the pure product is usually obtained in 80 to 95 percent of the theoretical yield. If the reaction is carried further so that the crude reaction mixture has an acid number of less than 2, it is relatively unstable and the amount of monoester present decreases quite rapidly. Therefore, for commercial operations the reaction will normally be regulated to produce the more stable crude reaction mixture with an acid number between 2 and 40.

The course of the reaction is followed by measuring the acid number of the mixture at intervals during the reaction. Experimentally, this is done by taking a sample of the mixture from the reaction and titrating it to determine the acid number at any particular time. When the desired acid number is obtained, the reaction vessel is taken away from the heating medium, cooled to atmospheric temperature, and the product distilled under reduced temperature. For most commercial operations the product can be used in the crude, undistilled stage. However, it cannot be preserved for long periods of time without formation of the diester which starts forming a short time after the termination of the reaction. Only by subsequent vacuum distillation is a product obtained that remains unchanged for relatively long periods of time. Apparently the conversion of monoester on standing is due to transesterification with production of diesters.

An optimum temperature for the reaction is around 70 to 75° C., although temperatures in the range of 50 to 100° C. more or less can be used. When high temperatures are used, the unsaturated acids of the mixture polymerize during the long reaction. If a low temperature is used the reaction is very slow and in some cases not feasible at all.

The use of solvent in the reaction mixture reduces the speed of reaction. In addition, the presence of solvent in the final product necessitates one more step for its eventual elimination. Most of the products are water soluble; for those that are not, aqueous reaction mixtures may be used if the water does not hydrolyze the ester, but generally water and other solvents are to be avoided. The examples include the use of a limited amount of water, i.e. equal weights of catalyst and water, with certain inorganic catalysts, and with such catalysts a limited amount of water may be desirable.

The amount of catalyst is important to obtain products with the desired acid number in the shortest possible time at a given temperature. Very small amounts of catalyst in the range of not more than several hundredths part, and preferably about 0.010 to 0.015 moles of catalyst per mole of acid are most satisfactory. When excess of catalyst is used the undesirable diester is rapidly formed and the reaction cannot be easily controlled; when insufficient amounts of catalyst are used the reaction is very slow.

An excess of alkylene oxide, i.e. the use of 1.05 to 1.5 molecular equivalents to 1.0 molecular equivalent of the acid is necessary to induce and insure complete esterification.

In order to simplify the explanation, abbreviations are used, as follows, to identify the various monoesters:

EGA—Ethylene Glycol Acrylate
PGA—Propylene Glycol Acrylate
BGA—Butylene Glycol Acrylate
EGMA—Ethylene Glycol Methacrylate
PGMA—Propylene Glycol Methacrylate
BGMA—Butylene Glycol Methacrylate The following examples illustrate the principles of the invention, and preferred modes of practicing the invention.

EXAMPLE 1

*Beta-hydroxyethyl acrylate*

One hundred eight grams of acrylic acid (1.5 moles), 88 grams of ethylene oxide (2 moles), and 1.91 grams of N-methyl morpholine (0.019 mole) were shaken in an autoclave at 70° C. The course of the reaction was followed by measuring the acid number of the mixture at various intervals of time. After a total of 11 hours reaction time, the mixture showed an acid number of 2. The reaction flask was, then, taken out of the 70° C. heating medium, cooled to room temperature, and the contents distilled under reduced pressure. Approximately 166 grams of pure ethylene glycol acrylate boiling at 64° to 65° C. at 2 mm. of Hg pressure were obtained. The colorless, water-soluble product showed an acid number of substantially zero, a refractive index, $20_D$, of 1.4433, and a saponification value of 116. It could remain unchanged for several months at atmospheric temperatures.

In another experiment, the above mixture was allowed to react at 70° C. for 20 hours. At the end of this time, the acid number of the product was zero but the mixture was to a large extent insoluble in water, indicating that the diester had already been formed, due to the prolonged reaction.

EXAMPLE 2

*Beta-hydroxyethyl alpha-methacrylate*

One hundred twenty-nine grams of alpha-methacrylic acid (1.5 moles), 88 grams of ethylene oxide (2.0 moles), and 5 grams of solid sodium methacrylate (0.046 mole) were sealed in a bottle equipped with a rubber cap and shaken in a water bath at 70° C. After 16 hours reaction, a sample was taken from the flask by means of a syringe and upon titration it showed an acid number of 21. Another sample taken after 20 hours reaction had acid number 9.2. The mixture was, then, allowed to react for 7 additional hours (total reaction time: 27 hours). At the end of this time, the bottle was taken off the 70° C. water bath, cooled to room temperature and opened. The crude, colorless, water-soluble ethylene glycol monomethacrylate showed an acid number of 2.5. Vacuum distillation of the mixture afforded 90 percent of pure product boiling at 69° to 71° C. at 2.5 mm. of Hg pressure. The product had an acid number almost zero, a saponification value of 131, and a refractive index, $20_D$, of 1.4531.

EXAMPLE 3

*Beta-hydroxypropyl acrylate*

One hundred eight grams of acrylic acid (1.5 moles), 116 grams of propylene oxide (2 moles), and 2.42 grams of N,N-dimethylcyclohexylamine (0.019 mole) were shaken in an autoclave at 70° C. for 16 hours. At the end of this time, the mixture showed an acid number of 8.6 and upon further reaction for 4 additional hours (total reaction time: 20 hours), the acid number dropped to 2.1. The mixture was then distilled under reduced pressure and 176 grams (91 percent) of pure propylene glycol acrylate boiling at 70° at 71° C. at 2 mm. of Hg pressure were obtained. The colorless, water-soluble product had an acid number of about 0.2, a refractive index, $20_D$, of 1.4465, and a saponification value of 131.

EXAMPLE 4

*Beta-hydroxypropyl alpha-methacrylate*

One hundred twenty-nine grams of glacial methacrylic acid (1.5 moles), 116 grams of propylene oxide (2.0 mloes), and 3.1 grams of N,N-diethylbenzylamine (0.019 mole) were shaken in an autoclave at 70° C. After 16 hours of reaction, the acid number of the mixture was 19, after 21 hours it was 9.8, and at the end of 23 hours of reaction the acid number of the mixture was 6. Vacuum distillation of the crude product afforded 162 grams of pure propylene glycol monomethacrylate boiling at 76° to 78° C. at 2.5 mm. of Hg pressure. The colorless, water-insoluble liquid had an acid number of substantially zero, a saponification value of 145, and a refractive index, $20_D$, of 1.4429.

EXAMPLE 5

*Beta-hydroxybutyl acrylate*

One hundred eight grams of acrylic acid (1.5 moles), 144 grams of butylene oxide (2.0 moles), and 1.91 grams of N-methylmorpholine (0.019 mole), were shaken in an autoclave at 70° C. for 27 hours. The course of the reaction was followed in the usual manner by measuring the acid number of the mixture at various intervals of time. After 16 hours reaction the mixture had an acid number of 14, after 24 hours the acid number was 5.7, and at the end of 27 hours of reaction the mixture showed an acid number of 2.6. Vacuum distillation of the crude product gave 173 grams (80 percent of the theoretical) of pure beta-hydroxybutyl acrylate boiling at 75° to 77° C. at 2 mm. of Hg pressure. The colorless, water-insoluble product had an acid number of 0.45, a refractive index, $20_D$, of 1.4488, and a saponification value of 145 against a calculated saponification value of 144.

EXAMPLE 6

*Beta-hydroxybutyl alpha-methacrylate*

One hundred twenty-nine grams of glacial methacrylic acid (1.5 moles), 144 grams of propylene oxide, and 1.91 grams of N-methylmorpholine (0.019 mole) were allowed to react in an autoclave at a constant temperature of 70° C. After 24 hours of reaction the mixture had an acid number of 21.6 and at the end of 40 hours of total reaction time, the reaction flask was taken off the heating medium and its contents allowed to cool at atmospheric temperature. At this point the crude product showed an acid number of about 4.1. Upon distillation under reduced pressure 181 grams of pure butylene glycol monomethacrylate boiling at 77° to 79° C. at 2 mm. of Hg pressure were obtained. The product was a colorless, water-insoluble liquid and it had an acid number of 0.7, a refractive index, $20_D$, of 1.4502, and a saponification value of 159.5 against a calculated saponification value of 158.

Following the general procedure of the foregoing examples, other reactions were carried out as indicated in the following table. The reactants are readily determined by referring to the product obtained, as indicated in the last column. The acrylate or methacrylate was produced depending upon whether acrylic acid or methacrylic acid was used in the process; and ethylene oxide, propylene oxide and the commercial butylene oxide were used to produce the respective esters. The amount of catalyst used is given as moles per mole of acid entering into the reaction.

It was found that the use of solvent slowed the reaction when pyridine was the catalyst. (Compare runs Nos. 26 and 27 in Table 1.) Also, with sodium hydroxide and potassium hydroxide, water facilitates the reaction, and for this reason 50 percent aqueous solutions of these materials were used in runs Nos. 5, 11, 28, 36 and 42. In the runs where water or solvent was employed, these materials were stripped off prior to the final distillation.

The various monoesters were obtained in a high state of purity on distillation of the crude products obtained by continuing the reactions until the crude reaction products had the acid numbers indicated.

TABLE 1

| Run No. | Catalyst | Moles per Mole of Acid | Reaction Time in Hours | Acid No. of Crude Product | Product Obtained |
|---|---|---|---|---|---|
| 1 | N-methyl morpholine | 0.0127 | 11 | 2.0 | EGA |
| 2 | N-ethyl piperidine | 0.0127 | 8 | 6.7 | EGA |
| 3 | N,N-dimethylcyclohexylamine | 0.0106 | 14 | 2.0 | EGA |
| 4 | Pyridine (solvent used).[1] | 0.0127 | 24 | 22.0 | EGA |
| 5 | NaOH aqueous (50% solvent) | 0.0130 | 21 | 9.5 | EGA |
| 6 | Calcium hydroxide | 0.0130 | 24 | 22.0 | EGA |
| 7 | N-methyl morpholine | 0.0127 | 16 | 5.1 | PGA |
| 8 | N-ethyl piperidine | 0.0127 | 15 | 11.8 | PGA |
| 9 | Pyridine (solvent used).[1] | 0.0127 | 22 | 24.8 | PGA |
| 10 | N,N-dimethylcyclohexylamine | 0.0127 | 20 | 2.1 | PGA |
| 11 | KOH aqueous (50% solvent) | 0.0127 | 21 | 24.0 | PGA |
| 12 | N,N-diethylbenzylamine | 0.0127 | 23 | 4.1 | PGA |
| 13 | Di-n-butylamine | 0.0127 | 23 | 35.0 | PGA |
| 14 | N-ethylpiperidine | 0.0127 | 18 | 9.5 | BGA |
| 15 | Pyridine (solvent used).[1] | 0.0127 | 22 | 42.4 | BGA |
| 16 | N,N-dimethylcyclohexylamine | 0.0127 | 21 | 22.9 | BGA |
| 17 | N-methylmorpholine | 0.0127 | 24 | 5.7 | BGA |
| 18 | Di-n-butylamine | 0.0127 | 40 | 54.0 | BGA |
| 19 | Calcium hydroxide | 0.0127 | 40 | 30.0 | BGA |
| 20 | N-methylmorpholine | 0.0100 | 16 | 4.0 | EGMA |
| 21 | N-ethylpiperidine | 0.0127 | 8 | 7.0 | EGMA |
| 22 | N,N-dimethylcyclohexylamine | 0.0127 | 12 | 3.5 | EGMA |
| 23 | Tri-n-butylamine | 0.0106 | 16 | 2.7 | EGMA |
| 24 | Di-n-butylamine | 0.0127 | 16 | 4.5 | EGMA |
| 25 | Isobutylamine | 0.0080 | 16 | 91.0 | EGMA |
| 26 | Pyridine (solvent used).[1] | 0.0127 | 24 | 46.0 | EGMA |
| 27 | Pyridine (no solvent) | 0.0127 | 14 | 2.0 | EGMA |
| 28 | NaOH aqueous | 0.0130 | 27 | 22.0 | EGMA |
| 29 | Sodium methacrylate | 0.0306 | 27 | 2.5 | EGMA |
| 30 | Calcium hydroxide | 0.0130 | 50 | 36.0 | EGMA |
| 31 | N-methylmorpholine | 0.0070 | 21 | 28.0 | PGMA |
| 32 | N-ethylpiperidine | 0.0127 | 19 | 2.4 | PGMA |
| 33 | N,N-dimethylcyclohexylamine | 0.0106 | 29 | 4.5 | PGMA |
| 34 | N,N-diethylbenzylamine | 0.0127 | 23 | 6.0 | PGMA |
| 35 | Pyridine (solvent used).[1] | 0.0127 | 24 | 51.0 | PGMA |
| 36 | KOH aqueous | 0.0130 | 60 | 40.0 | PGMA |
| 37 | Calcium hydroxide | 0.0130 | 80 | 45.0 | PGMA |
| 38 | Sodium methacrylate | 0.0306 | 40 | 40.0 | PGMA |
| 39 | N-methylmorpholine | 0.0127 | 24 | 21.6 | BGMA |
| 40 | N,N-diethylbenzylamine | 0.0127 | 23 | 14.2 | BGMA |
| 41 | N,N-dimethylcyclohexylamine | 0.0106 | 53 | 14.0 | BGMA |
| 42 | KOH aqueous | 0.0130 | 64 | 34.0 | BGMA |
| 43 | Calcium hydroxide | 0.0130 | 48 | 39.0 | BGMA |
| 44 | N-ethylpiperidine | 0.0127 | 18 | 38.5 | BGMA |

[1] Reaction mixture contained 2 moles of benzene solvent per mole of acid.

The invention is covered by the claims.

What we claim is:

1. The method of producing an alkylene glycol monoester, which comprises reacting (1) 1.05 to 1.50 molecular equivalents of an alkylene oxide in which the alkylene group contains 2 to 4 carbon atoms, with (2) one molecular equivalent of an acid from the class consisting of acrylic and methacrylic acids, using an alkaline catalyst, and stopping the reaction when the acid number is 2 to 40.

2. The process of claim 1 in which the crude reaction product with an acid number of 2 to 40 is distilled.

3. The process of claim 1 in which from 0.010 to 0.015 mole of catalyst are used and the catalyst is a tertiary heterocyclic amine having the formula

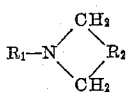

in which $R_1$ is an alkyl group of 1 to 4 carbon atoms and $R_2$, which is in the ring, is from the class consisting of $-CH_2.O.CH_2-$, $-CH_2.CH_2.CH_2-$, $-CH_2.CH_2-$, $-CH_2.O-$, $-CH_2.CH_2.O-$ and $-CH_2.NR_3.CH_2-$ in which latter $R_3$ is from the class consisting of hydrogen and alkyl substituents containing up to five carbon atoms.

4. The process of claim 1 in which the catalyst is N-alkylmorpholine.

5. The process of claim 1 in which the catalyst is N-alkyl piperidine.

6. The process of claim 1 in which the catalyst is a tertiary aliphatic amine in which two of the substituents are alkyl groups of 1 to 4 carbon atoms and the third substituent is selected from the group consisting of (a) alkyl groups of 1 to 4 carbon atoms, (b) cyclohexyl and (c) aralkyl groups in which the aryl component is phenyl substituted in an alkyl group of 1 to 2 carbon atoms.

7. The process of claim 1 in which the catalyst is a trialkyl amine.

8. The process of claim 1 in which the catalyst is tri-n-butylamine.

9. The process of claim 1 in which the catalyst is dimethylcyclohexylamine.

10. The process of claim 1 in which the catalyst is diethylbenzylamine.

11. The process of claim 1 in which the catalyst is from the class consisting of basic oxides, hydroxides, acrylates and methacrylates of the alkali and alkaline earth metals.

12. The process of claim 1 in which the catalyst is sodium hydroxide.

13. The process of claim 1 in which the catalyst is potassium hydroxide.

14. The process of claim 1 in which the catalyst is an alkali metal salt of the acid entering into the reaction.

15. The process of claim 1 in which the catalyst is sodium methacrylate and methacrylic acid is the acid entering into the reaction.

References Cited in the file of this patent

UNITED STATES PATENTS 2,484,487    Caldwell    Oct. 11, 1949
2,819,296    Carnes et al.    Jan. 7, 1958